No. 868,561. PATENTED OCT. 15, 1907.
C. HOFFMAN.
COFFEE POT AND STEEPER.
APPLICATION FILED NOV. 21, 1906.
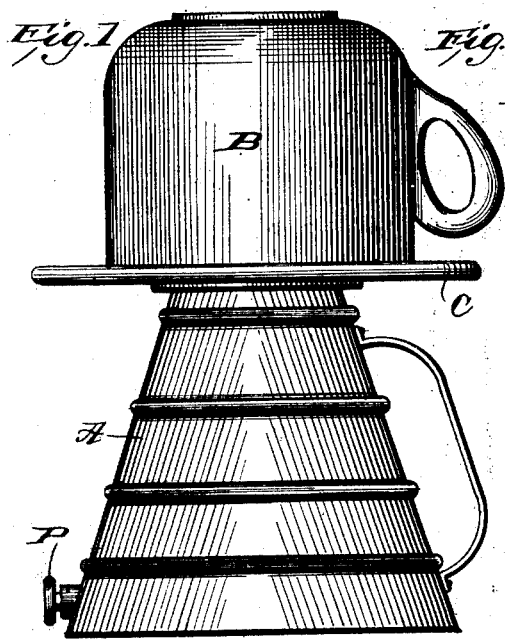
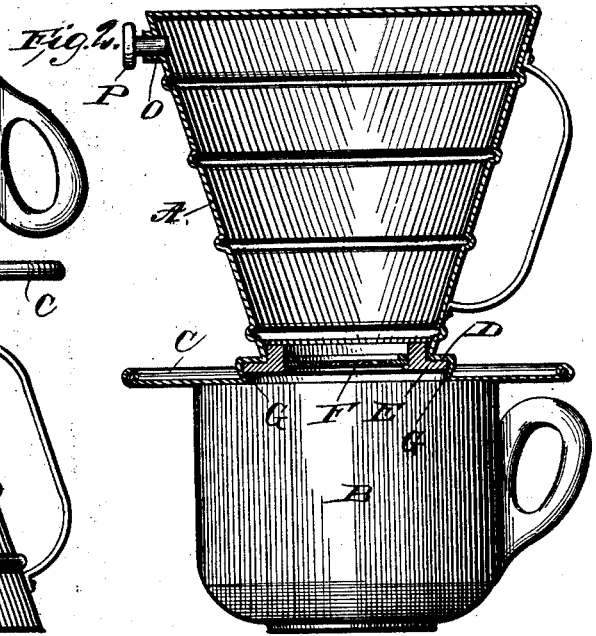
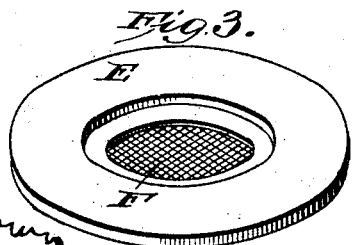
WITNESSES
INVENTOR
CARL HOFFMAN
BY
ATTORNEYS

UNITED STATES PATENT OFFICE.

CARL HOFFMAN, OF DETROIT, MICHIGAN.

COFFEE POT AND STEEPER.

No. 868,561.     Specification of Letters Patent.     Patented Oct. 15, 1907.

Application filed November 21, 1906. Serial No. 344,371.

*To all whom it may concern:*

Be it known that I, CARL HOFFMAN, a subject of the Emperor of Germany, residing in the United States of America, in the city of Detroit, county of Wayne, and State of Michigan, have invented a new and Improved Coffee Pot and Steeper, of which the following is a specification.

This invention has to do with vessels, such as coffee or tea boiling and steeping pots, and has for its object novel and useful improvements in vessels of this general character, whereby coffee or tea may be boiled and then steeped, to improved degree, the vessel being adapted for the use therewith, of a common coffee, or tea cup, the latter when arranged in place, serving as a cover to the vessel, and in addition, being adapted, upon turning them upside down, to position with the vessel resting upon the cup, to permit effective steeping of the coffee or tea, and then drawing, or permitting flow of the infusion thus made, direct into the cup from the boiling and infusing vessel.

The invention consists of the special construction and arrangement of parts shown by the accompanying drawing, and hereinafter fully described, the features of novelty being pointed out in the appended claims.

In the drawing—Figure 1 is an elevated view of my improved boiling and steeping vessel, with a cup shown arranged thereon. Fig. 2 is a vertical sectional view through the vessel, the cup being shown in side elevation, in the view the cup and vessel are illustrated turned upside down. Fig. 3 is a perspective view of a special strainer used by me.

In the several views of my drawing A designates a vessel into which coffee, or tea, may be boiled, as will be understood, and B, a common form of coffee or tea cup. The boiling and steeping vessel is constructed with a projecting flange C. The mouth or opening of the vessel is constructed with a depressed seat D, adapted to receive a disk E, the latter being constructed with an opening into which strainer cloth F is secured by any suitable means. The inner side of the depressed seat is made converging at G, see Fig. 2, whereby when the disk is shoved to its seat, it will be held in place.

Upon reference to Figs. 1 and 2 it will be noticed that the cup B has support upon the top side or flange portion of the vessel A. It is intended that the disk E be made readily detachable, for purposes of placing water and coffee, or tea, in the vessel when starting to make the solution.

In further carrying out my invention I provide the boiling and steeping vessels A with an opening O adapted to be closed, with a suitable plug P.

The construction of my invention will be understood from the above description and the views of illustration.

In the use of my improved boiling and steeping apparatus, sufficient water is first placed in the vessel, and coffee or tea added thereto as understood. After boiling the mixture, as desired, the apparatus is turned upside down with the boiling vessel A resting upon the cup B. In the inverted position of parts above described, it is apparent that through vacuum produced in the uppermost part of the vessel A, very little liquid, if any, will filter into the cup B. With the apparatus inverted as above described, the coffee or tea is left to steep awhile and thereafter the plug P is removed, permitting air to pass into the boiling vessel. Now it is apparent that upon inrush of air through the vessel opening O, the infusion will be permitted free flow through the filtering medium, into the cup below. Upon replacing the plug P into its opening O, it is understood that flow of the infusion into the cup will be stopped through production of renewed vacuum in the upper part of the inverted vessel A. When one cup of the infusion is drawn, it may be replaced by another cup to be filled with the infusion as above described.

It will be noticed that the upper side of the flange C, see Fig. 2, is adapted for draining steam condensing on and flowing down the inner side of the cup B, direct through the strainer into the vessel, thereby effectively preventing waste of the infusion, or the flowing thereof down the outer side of the vessel.

In drawing the infusion direct into the receiving vessel, or cup as described, there is no loss of flavor of the coffee or tea through escaping gases or steam, and thus full strength of the coffee or tea is insured in the drawn cup thereof.

I claim—

The combination in a boiling and steeping apparatus, of a vessel constructed with a closed bottom and an open top, the vessel being provided with an opening in its side, near the closed bottom thereof, means for closing said opening, an encircling flange extending outwardly from the vessel, with its upper surface arranged flush with the edge of said top opening, providing unobstructed drain or flow into the vessel, a seat at the open end of the vessel, the seat being provided therearound with a contracted upper portion, and a filter disk adapted to be arranged in said seat and retained therein by the contracted upper portion of the seat.

CARL HOFFMAN.

Witnesses:
   GUSTAV H. BOBERTZ,
   HENRY BOBERTZ.